(12) United States Patent
Schneider

(10) Patent No.: US 9,225,526 B2
(45) Date of Patent: Dec. 29, 2015

(54) MULTIFACTOR USERNAME BASED AUTHENTICATION

(75) Inventor: James Paul Schneider, Raleigh, NC (US)

(73) Assignee: Red Hat, Inc., Raleigh, NC (US)

(\*) Notice: Subject to any disclaimer, the term of this patent is extended or adjusted under 35 U.S.C. 154(b) by 1194 days.

(21) Appl. No.: 12/628,109

(22) Filed: Nov. 30, 2009

(65) Prior Publication Data

US 2011/0131415 A1  Jun. 2, 2011

(51) Int. Cl.
*H04L 9/32* (2006.01)
*G06F 21/34* (2013.01)
*H04L 29/06* (2006.01)

(52) U.S. Cl.
CPC .............. *H04L 9/3242* (2013.01); *G06F 21/34* (2013.01); *H04L 9/3226* (2013.01); *H04L 9/3234* (2013.01); *H04L 63/0853* (2013.01); *H04L 63/083* (2013.01)

(58) Field of Classification Search
CPC . H04L 63/083; H04L 9/3271; H04L 63/0838; H04L 63/0853; H04L 9/3234; H04L 9/3226; H04L 9/3242; H04L 63/0846; G06F 21/34
USPC ................................................... 726/5–7, 19
See application file for complete search history.

(56) References Cited

U.S. PATENT DOCUMENTS

| | | | |
|---|---|---|---|
| 5,491,752 A * | 2/1996 | Kaufman et al. | ............... 380/30 |
| 5,774,552 A | 6/1998 | Grimmer | |
| 6,049,612 A | 4/2000 | Fielder et al. | |
| 6,073,234 A | 6/2000 | Kigo et al. | |
| 6,085,320 A | 7/2000 | Kaliski, Jr. | |
| 6,189,096 B1 * | 2/2001 | Haverty | ........................ 713/155 |
| 6,243,811 B1 | 6/2001 | Patel | |
| 6,401,206 B1 | 6/2002 | Khan et al. | |
| 6,792,424 B1 | 9/2004 | Burns et al. | |
| 6,883,717 B1 | 4/2005 | Kelley et al. | |
| 7,031,468 B2 | 4/2006 | Hoffstein et al. | |
| 7,073,061 B2 | 7/2006 | Asano et al. | |
| 7,194,765 B2 | 3/2007 | Blom | |
| 7,231,521 B2 | 6/2007 | Buddhikot et al. | |
| 7,242,766 B1 | 7/2007 | Lyle | |
| 7,363,651 B2 | 4/2008 | de Jong et al. | |
| 7,673,142 B2 | 3/2010 | Jeffries et al. | |
| 7,945,776 B1 * | 5/2011 | Atzmony et al. | ............. 713/165 |
| 8,156,333 B2 | 4/2012 | Schneider | |

(Continued)

FOREIGN PATENT DOCUMENTS

WO   WO 2005002131 A1 *  1/2005  ................ H04L 9/14

OTHER PUBLICATIONS

J. Franka et al., "RFC 2617 HTTP Authentication: Basic and Digest Access Authentication", IETF (Jun. 1999).*

(Continued)

*Primary Examiner* — Theodore Parsons
(74) *Attorney, Agent, or Firm* — Lowenstein Sandler LLP

(57) ABSTRACT

A hashed value is computed from an encrypted password value and a displayed code value from a hardware token at a client. The encrypted password value is based on a username, a context identifier, and a password. The client provides the username and the hashed value to a server. The encrypted password value associated with the username is retrieved at the server. An expected hashed value is computed at the server. The client is validated based on a comparison of the hashed value and the expected hashed value.

16 Claims, 7 Drawing Sheets

(56) References Cited

U.S. PATENT DOCUMENTS

| | | | |
|---|---|---|---|
| 8,225,093 | B2 | 7/2012 | Fok et al. |
| 8,352,738 | B2 * | 1/2013 | Parno et al. ............... 713/168 |
| 8,660,268 | B2 | 2/2014 | Schneider |
| 2002/0056040 | A1 | 5/2002 | Simms |
| 2002/0146005 | A1 | 10/2002 | Gallant et al. |
| 2003/0014646 | A1 | 1/2003 | Buddhikot et al. |
| 2003/0093671 | A1 | 5/2003 | Owlett |
| 2003/0105964 | A1 * | 6/2003 | Brainard et al. ............ 713/178 |
| 2003/0233546 | A1 | 12/2003 | Blom |
| 2003/0236803 | A1 | 12/2003 | Williams |
| 2004/0223619 | A1 | 11/2004 | Jablon |
| 2005/0081036 | A1 | 4/2005 | Hsu |
| 2006/0021036 | A1 * | 1/2006 | Chang et al. .................. 726/22 |
| 2006/0041759 | A1 * | 2/2006 | Kaliski et al. ............... 713/184 |
| 2006/0235700 | A1 * | 10/2006 | Wong et al. .................. 704/275 |
| 2007/0005963 | A1 * | 1/2007 | Eldar et al. .................. 713/168 |
| 2007/0101152 | A1 * | 5/2007 | Mercredi et al. ............ 713/185 |
| 2007/0169181 | A1 * | 7/2007 | Roskind ........................... 726/5 |
| 2007/0226784 | A1 | 9/2007 | Ueda et al. |
| 2008/0034216 | A1 * | 2/2008 | Law ............................... 713/183 |
| 2008/0077979 | A1 * | 3/2008 | Jeffries et al. ..................... 726/6 |
| 2008/0155112 | A1 | 6/2008 | Ma et al. |
| 2008/0301435 | A1 | 12/2008 | Simon |
| 2009/0193511 | A1 * | 7/2009 | Noe et al. ........................... 726/9 |
| 2009/0271462 | A1 | 10/2009 | Schneider |
| 2009/0287929 | A1 | 11/2009 | Kolesnikov et al. |
| 2009/0288143 | A1 * | 11/2009 | Stebila et al. ..................... 726/3 |
| 2009/0300364 | A1 | 12/2009 | Schneider |
| 2010/0058060 | A1 | 3/2010 | Schneider |
| 2010/0131756 | A1 | 5/2010 | Schneider |

OTHER PUBLICATIONS

Oath Reference Architecture Release 2.0, Initiative for Open Authentication (2007).*
Office Action for U.S. Appl. No. 12/111,893 mailed Apr. 14, 2011.
Office Action for U.S. Appl. No. 12/111,893 mailed Oct. 11, 2011.
Office Action for U.S. Appl. No. 12/156,278, mailed Sep. 26, 2011.
Notice of Allowance for U.S. Appl. No. 12/156,278, mailed Nov. 23, 2011.
Office Action for U.S. Appl. No. 12/201,321 mailed Apr. 27, 2011.
Office Action for U.S. Appl. No. 12/201,321 mailed Oct. 13, 2011.
Office Action for U.S. Appl. No. 12/324,108, mailed Nov. 16, 2011.
Biryukov, Alex, et al.; Cryptanalysis of the Alleged SecurID Hash Function (extended version) Lecture Notes in Computer Science, Springer-Verlag, 2003, 18 pages.
Belare, Mihir, et al., "Keying Hash Functions for Message Authentication", ,http://cseweb.uscd.edu/~mihir/papers/kmd5.pdf . . . Published Jun. 1996.
USPTO, Office Action for U.S. Appl. No. 12/111,893 mailed Oct. 31, 2012.
USPTO, Office Action for U.S. Appl. No. 12/324,108, mailed Feb. 29, 2012.
Xiang, Fei et al. "A New Pseudo-Random Number Generator with Application in RSA", IEEE 2008.
USPTO, Office Action for U.S. Appl. No. 12/111,893 mailed Apr. 18, 2013.
USPTO, Notice of Allowance for U.S. Appl. No. 12/111,893 mailed Oct. 3, 2013.
USPTO, Office Action for U.S. Appl. No. 12/201,321 mailed Aug. 14, 2013.
Office Action for U.S. Appl. No. 12/201,321 mailed Apr. 8, 2014.

* cited by examiner

MULTIFACTOR USERNAME BASED AUTHENTICATION

TECHNICAL FIELD

Embodiments of the present invention relate to computing systems, and more particularly, to authentication over an insecure channel.

BACKGROUND

One means of authentication includes the use of password on computer systems. For example, on UNIX-type systems, the password for an account is stored in a hashed form. To make it harder for an attacker who has access to the hashed password to perform a class of brute force attacks and potentially gain knowledge of several passwords at once, the password is augmented with a small random value, also known as "salt" before it is hashed. The salt value and the hashed password are then stored in association with other account properties.

Since the salt value is randomly generated, only someone who already has access to the hashed password can compute what a hashed password value should be. This means that the hashed password has to be passed to the authentication process in clear text form. So, either the password must only be used over a secure connection, or the password can be stolen by an eavesdropper.

Thus, a need exists for a technique for a remote connection to authenticate itself over an insecure channel, without providing the password, without the server having access to the password in clear text, or without every password requiring the same type of encryption.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for an authentication protocol. In one embodiment, a hashed value is computed from an encrypted password value and a displayed code value from a hardware token at a client. The encrypted password value is based on a username, a context identifier, and a password. The client provides the username and the hashed value to a server. The encrypted password value associated with the username is retrieved at the server. An expected hashed value is computed at the server. The client is validated based on a comparison of the hashed value and the expected hashed value.

Figure 1:
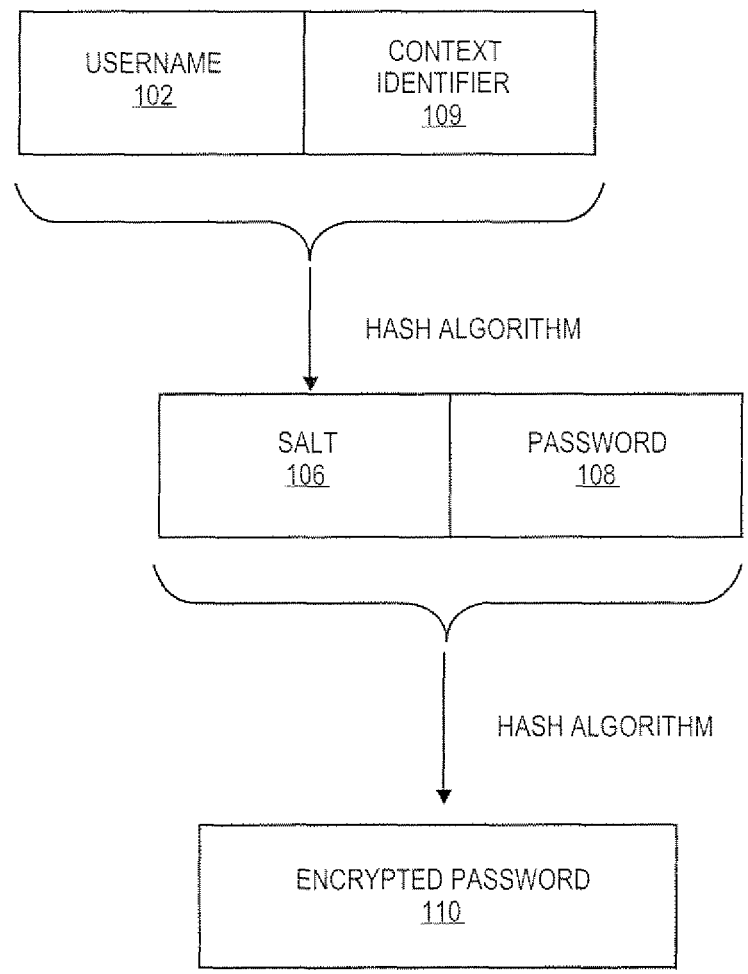
FIG. 1 is a block diagram illustrating one embodiment of a username-based authentication security.

FIG. 1 is a block diagram illustrating one embodiment of a username-based authentication scheme. Instead of using a random value for a salt, a username may be used as a basis for the salt value. In that way, the user is able to calculate the hashed password value himself. So that the same password can be used on multiple different systems, the username can be augmented with a system-specific authentication context identifier (e.g. a random string that each authentication system uses to distinguish itself). A salt value 106 can be calculated by concatenating a context identifier 104 and a username 102, and taking the cryptographic hash of that. Alternately, the context identifier 104 can be used as the key in a Message Authentication Code (MAC) over the username 102. An encrypted password 110 can be hashed by concatenating the calculated salt value 106 and a password 108, then hashing the result, or by using the salt value 106 as the key in a MAC construction (or alternately, using the password as the key, and the salt as the "message").

Figure 2:
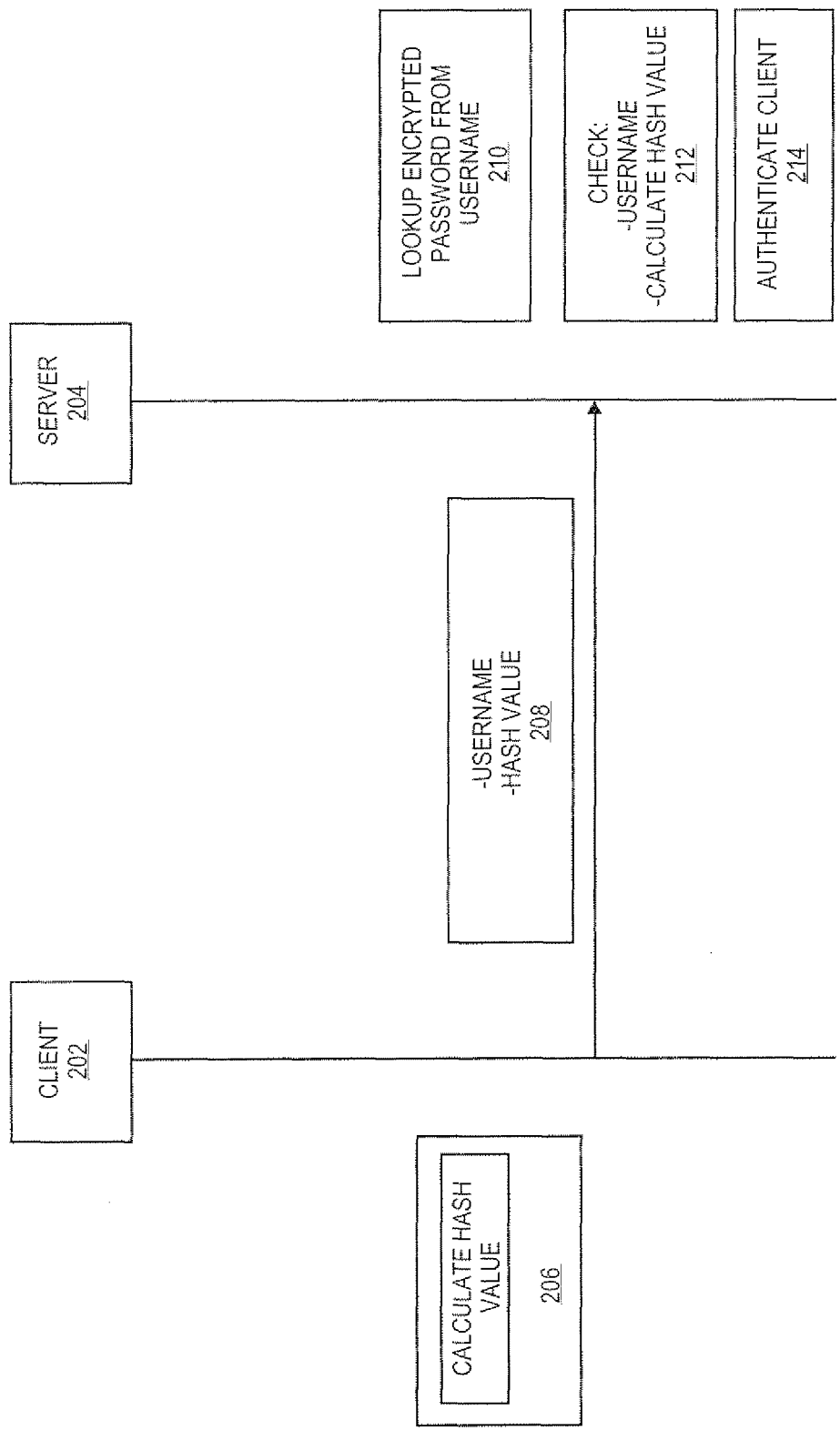
FIG. 2 is a ladder diagram illustrating one embodiment of a process for authentication over an unsecured channel.

FIG. 2 is a ladder diagram illustrating one embodiment of a process for authentication over an unsecured channel between a client 202 and a server 204. In 206, client 202 calculates a hash value from the encrypted password value 110 as computed in FIG. 1 and from a currently displayed code value from a hardware token. Hardware tokens include hardware devices that present users with a 6 or 8 digit numeric key value that changes every 30 or 60 seconds. Each user's hardware token displays a different sequence of values, based on the unique key embedded within the device.

The hashed value 206 can be a concatenation and hash construction, or a MAC. At this point, iterating the hash or MAC function does provide additional security, since it makes a brute-force attack more time-consuming. Given that the token's displayed value is only valid for a minute at most, and that the brute force attack would depend on the resources of the server to be accomplished, even a moderate iteration count would make a brute force attack effectively impossible. To authenticate, the client provides the username, and the hashed value 206 calculated to server 204 at 208.

Server 204 looks up the encrypted password from the username at 210, calculate the value it expects that user's token to be displaying at that point it in time, and calculate the combined password—token code hash/MAC from these encrypted values at 212. If it matches what was provided by client 202, client 202 is then authenticated at 214. Because the code provided by the token changes on a frequent basis, and the protocol could span a code change boundary (either because client 202 is slow, or the data path between client 202 and server 204 is, or a combination of both), server 204 may need to check the expected previous value, too.

In summary, client 202 just sends a single communication to authenticate. It may need to request the security context identifier, but presumably it would only need to do that one time, not each time it attempts to authenticate. There is no timestamp value in this protocol, since the value displayed by the hardware token is time based. This protocol sends no unencrypted data—as long as the hash or MAC functions are secure, the protocol is, too.

Figure 3:
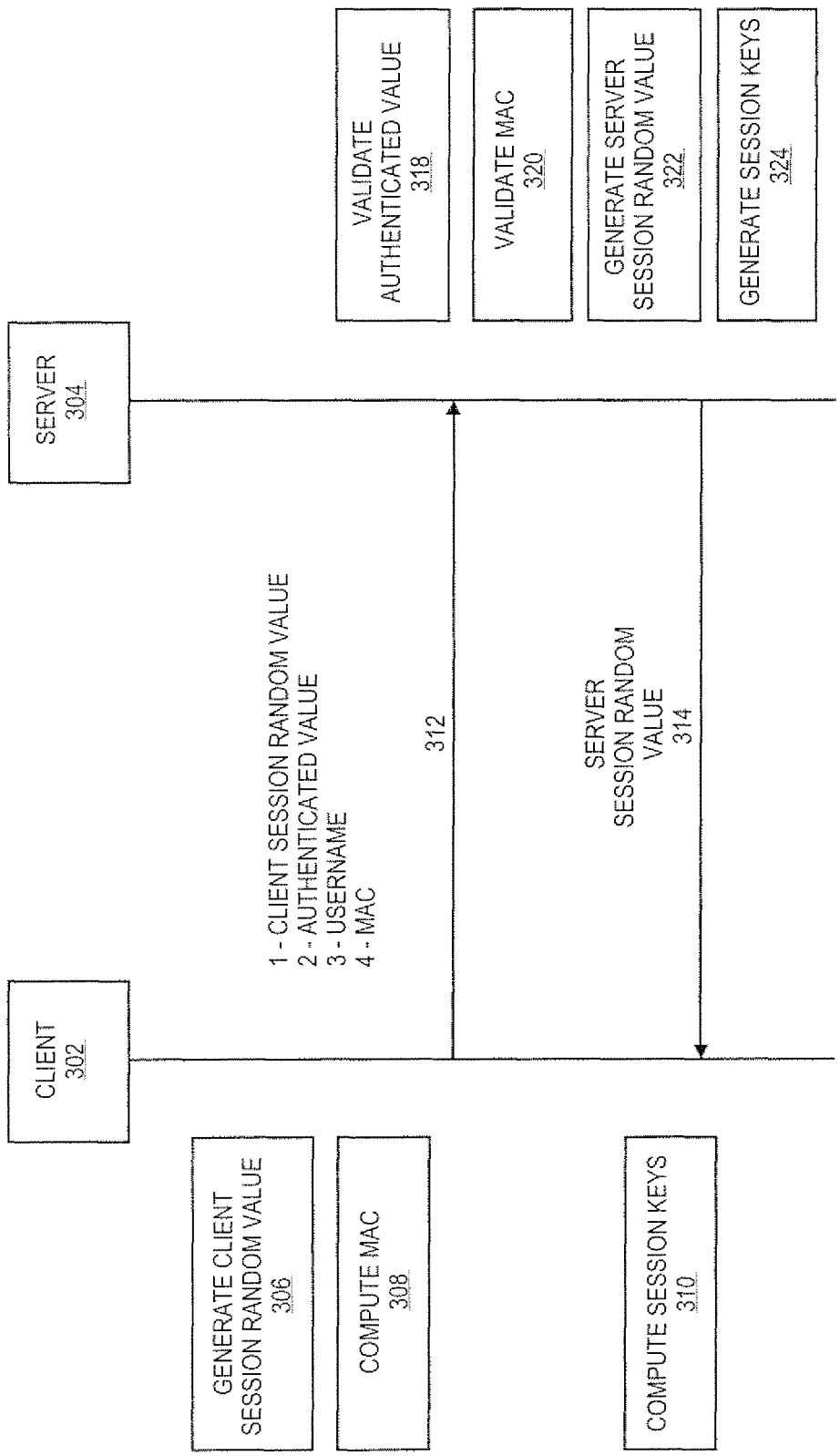
FIG. 3 is a ladder diagram illustrating one embodiment of a process for authenticating and negotiating a shared session key.

FIG. 3 is a ladder diagram illustrating one embodiment of a process for authenticating and negotiating a shared session key. The protocol would start with the encrypted password, and proceed as follows: at 306, client 302 generates a session random value—this value should be at least as large as the number of bits required for the session key. At 308, client 302 computes the MAC value. Client 302 assembles the session random value, the authentication value calculated in the earlier protocol, and the username. These values are concatenated, and a MAC is computed over them using both the encrypted password and the current value displayed on the token as keying data. These four values (the session random value, the authentication value, the username, and the MAC) are sent to the server at 312.

Server 304 validates the authentication value at 318 as in the protocol above, and checks that the MAC value is valid for the provided data at 320. Presuming the authentication step is successful, the server generates its own session random value at 322. Client 302 and server random values, the encrypted password, and the current display value from the token are all used to generate the required session keys at 324. For example, they could all be concatenated, and an iterated hash can be used. Alternately, the two random values can be concatenated, the encrypted password and displayed code value can be concatenated, and these two values used as inputs in an iterated MAC. However they are derived, the server provides a message that consists of the server random value, and an acknowledgment that is enciphered using the appropriate session key.

Client 302 takes the server random value 314, uses it to derive the appropriate session keys 310, and checks to make sure it can decipher the acknowledgment. The protocol could include an enciphered MAC as part of the acknowledgment (similar to SSL).

The following describes the communication that takes place after the keys are generated. Currently accepted security practice for enciphered point-to-point communication is to use four session keys—one for bulk encipherment each direction, and one to compute message authentication codes over the data portion of the communication in each direction. In the TLS standard, one of the ways these session keys are derived is from two random client values and a random server value in an iterated HMAC construction.

The TLS specified construction uses a secret ("s"), a seed value ("d"), and a label value ("l"). If HMAC(k, m) is a message authentication code using HMAC/SHA-256, with a key of k over the message m, and string concatenation is symbolized by the vertical bar ('|'), the following equations define how TLS generates a sequence of pseudo-random bytes:

$$A(s,0)=d$$

$$A(s,n)=HMAC(s,A(s,n-1))$$

$$P(s,d)=HMAC(s,A(s,1)|d)|HMAC(s,A(s,2)|d)|HMAC(s,A(s,3)|d)\ldots$$

$$PRF(s,l,d)=P(s,l|d)$$

The string generated by the pseudo-random function. PRF (s, l, d) is then parceled out between the client-to-server MAC key, the server-to-client MAC key, the client-to-server encipherment key, and the server-to-client encipherment key. TLS specifies a "secret" value as either specified by the client or as jointly computed by the client and server, and a "seed" value as specified jointly by the client and server. For key bytes, the label "key expansion" (represented as an ASCII string, without quotes, length bytes, or delimiters) is used.

This construction can be used to generate session keys from the enciphered password, the currently displayed code value, and the client and server random values by calculating s=HMAC(p, t), where "p" is the encrypted password and "t" is the currently displayed code. Then, use PRF(s, "key expansion", $R_c|R_s$) where the subscribed R values are the client and server random values. Alternately, the currently displayed code value could be used as the label.

Figure 4:
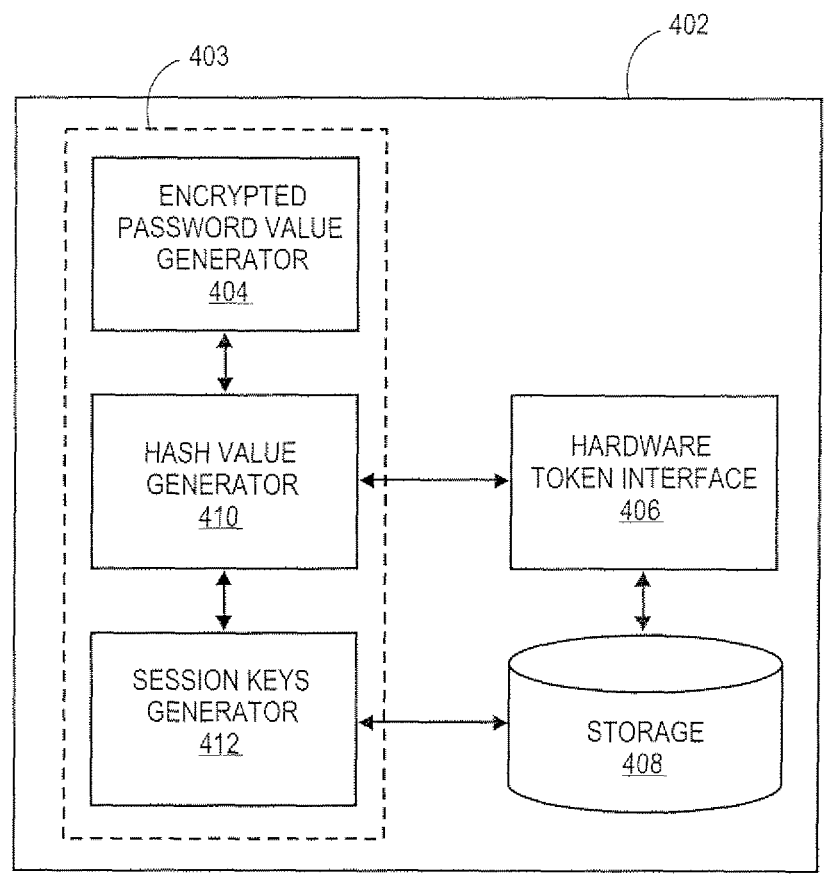
FIG. 4 is a block diagram illustrating one embodiment of a client for authentication over an unsecured channel.

FIG. 4 is a block diagram illustrating one embodiment of a client 402 for authentication over an unsecured channel. Client 402 includes encryption module 403, hardware token interface 406, and storage device 408. Encryption module 403 includes an encrypted password value generator 404, a hash value generator 410, and a session keys generator 412.

Encrypted password value generator 404 is configured to generate an encrypted password value by first combining the username and a security context identifier to produce a salt value. The security context identifier is any string that can be unambiguously determined by the client and is unique to the authentication domain against which the client is authenticating. For example, vpn logins for "Acme, Inc." could just use the string "ACMEVPN". "Combining" the username and this identifier can be accomplished by concatenating them and hashing the result, or the username and password could be used as string and key (in either order) to a message authentication code. This can also be iterated an arbitrary number of times, but iteration provides no real additional security at this stage (since this operation can be done once and stored for each particular username-security ID combination).

This salt value is combined with the password in a similar fashion to produce an encrypted password value. Again, this can be concatenation and hashing, or a message authentication code. Iterating the combination function can also be done, but it provides no real security here, either. This encrypted password value would be stored on the server. It is assumed that the client would compute this every time it is required from the inputs provided by the user (but this assumption is not a requirement, and it doesn't affect the rest of the protocol).

Hash value generator 410 calculates a hashed value from the encrypted password value and the currently displayed code value from the hardware token. This can be a concatenation and hash construction, or a MAC. At this point, iterating the hash or MAC function does provide additional security, since it makes a brute-force attack more time-consuming.

Session keys generator 412 receives a server random value and uses it to derive the appropriate session keys, and checks to make sure it can decipher the acknowledgment. The protocol could include an enciphered MAC as part of the acknowledgment (similar to SSL).

Hardware token interface 406 includes a user input for a user to enter a current token display value from a hardware token.

Storage device 408 is configured to store session keys, hash values, encrypted password values.

Figure 5:
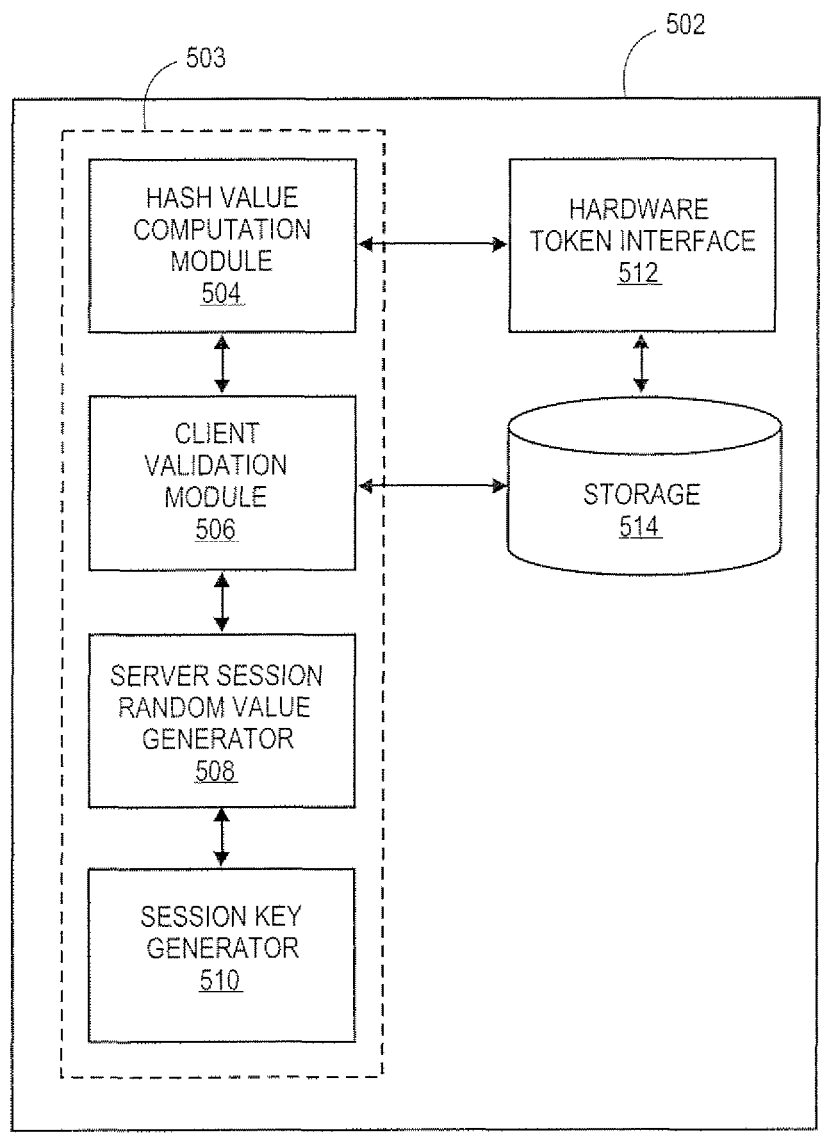
FIG. 5 is a block diagram illustrating one embodiment of a server for authentication over an unsecured channel.

FIG. 5 is a block diagram illustrating one embodiment of a server 502 for authentication over an unsecured channel. Server 502 includes an encryption module 503, a hardware token interface 512, and a storage device 514. Encryption module 503 includes a hash value computation module 504, a client validation module 506, a server session random value generator 508, and a session key generator 510.

Hash value computation module 504 is configured to look up the encrypted password from the username, calculate the value it expects that user's token to be displaying at that point in time, and calculate the combined password—token code hash/MAC from these expected values.

Client validation module 506 is configured to determine whether the calculated combined password matches what was provided by the client. If there is a match, the client is authenticated.

Server session random value generator 508 is configured to generate a session random value, assuming the authentication step is successful.

Session key generator 510 is configured to use the client and server random values, the encrypted password, and the current display value from the token to generate the required session keys. For example, they could all be concatenated, and an iterated hash can be used. Alternately, the two random values can be concatenated, the encrypted password and displayed code value can be concatenated, and these two values used as inputs in an iterated MAC. However they are derived, the server provides a message that consists of the server random value, and an acknowledgment that is enciphered using the appropriate session key.

Hardware token interface 512 is configured to receive a current token display value associated with the hardware token of the user.

Figure 6:
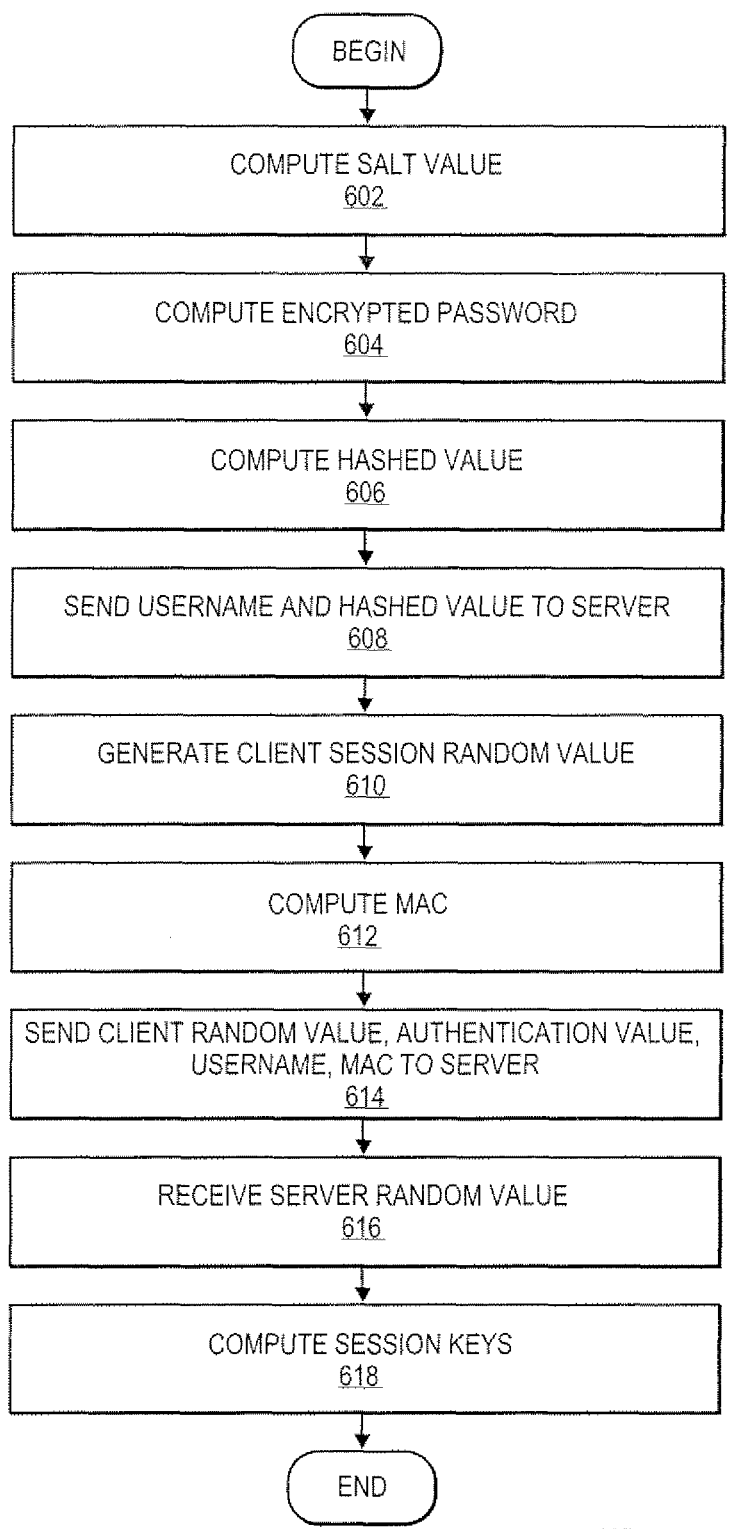
FIG. 6 is a flow diagram illustrating a method for authenticating a communication from a client over an unsecured channel.

FIG. 6 is a flow diagram illustrating a method for authenticating a communication from a client over an unsecured channel. At 602, a salt value is computed as previously described. At 604, an encrypted password is computer based on the salt value and a password. At 606, the hashed value of the encrypted password is computed. At 608, the username and hashed value is sent to a server. At 610, client generates a session random value. At 612, client computes a MAC value based on the session random value. At 614, client sends to server, client random value, authenticated value, username. MAC value to server. At 616, client receives a server random value. At 618, client computes session keys.

Figure 7:
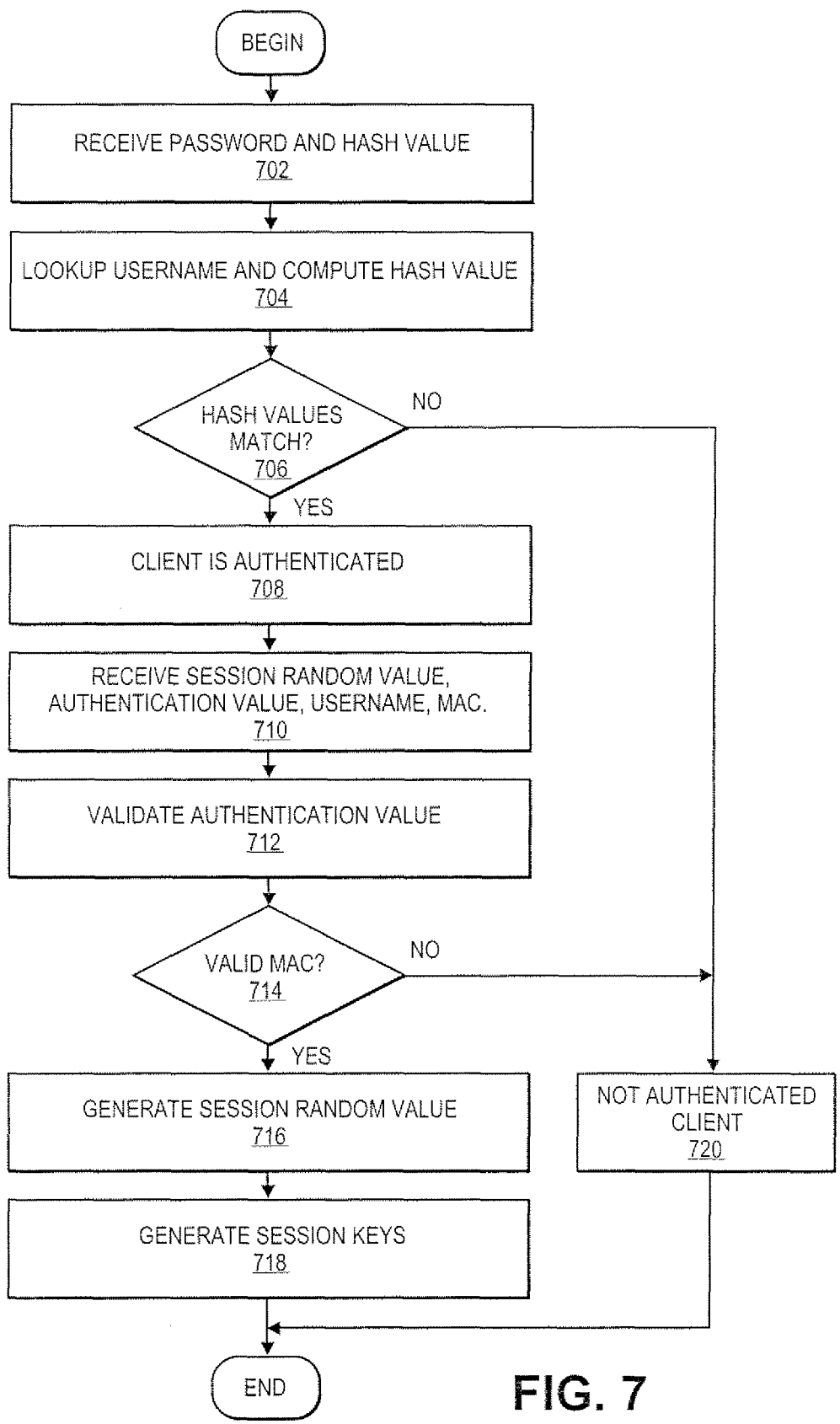
FIG. 7 is a flow diagram illustrating a method for authenticating a communication from a server over an unsecured channel.

FIG. 7 is a flow diagram illustrating a method for authenticating a communication from a server over an unsecured channel. At 702, server receives a password and a hash value from client. At 704, server looks up the encrypted password from the username, calculate the value it expects that user's token to be displaying at that point it in time and calculate the combined password—token code hash/MAC from these expected values. At 706, if it matches what was provided by the client, the client is authenticated at 708. Otherwise, the client is not authenticated at 720.

At 710, server receives the session random value, the authentication value, the username, and the MAC.

At 712, server validates the authentication value as in the protocol above, and checks that the MAC value is valid for the provided data at 714.

At 716, presuming the authentication step is successful, the server generates its own session random value. At 718, the client and server random values, the encrypted password, and the current display value from the token are all used to generate the required session keys.

FIGS. 4 and 5 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate. In the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 402 and 502 includes a processing device, a main memory (e.g., read-only memory (ROM), flash memory, dynamic random access memory (DRAM) such as synchronous DRAM (SDRAM), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device also be one or more special-purpose processing devices such as an application specific integrated circuit (ASIC), a field programmable gate array (FPGA), a digital signal processor (DSP), network processor, or the like. The processing device is configured to execute the processing logic for performing the operations and steps discussed herein.

The computer system further include a network interface device.

The data storage device may include a machine-accessible storage medium on which is stored one or more sets of instructions (e.g., software) embodying any one or more of the methodologies or functions described herein. The software may also reside, completely or at least partially, within the main memory and/or within the processing device during execution thereof by the computer system, the main memory and the processing device also constituting machine-accessible storage media. The software may further be transmitted or received over a network via the network interface device.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device of a server, a message comprising a username and a first hashed value;
   retrieving a hashed password associated with the username;
   calculating a time-dependent value associated with the username;
   calculating a second hashed value using the username, the hashed password, and the time-dependent value;
   determining whether the second hashed value matches the first hashed value from the message;
   receiving a client session random value and a Message Authentication Code (MAC) value;
   validating the MAC value at the server using the client session random value, the second hashed value, and a displayed code value from a hardware token;
   generating a server session random value at the server; and
   generating, by the processing device of the server, a session key by executing an iterative MAC function over: a concatenation of the server session random value and the client session random value, and a concatenation of the hashed password and the displayed code value from the hardware token.

2. A method comprising:
   computing, by a processing device of a client, a hashed password value from a password, a username, and a security context identifier;
   computing a hashed value from a time-dependent value associated with the username and the hashed password value;
   transmitting a message comprising the username, the hashed value, a client session random value, and a Message Authentication Code (MAC) value, wherein the MAC value is generated with a first MAC function executed by the processing device of the client;
   generating the client session random value at the client;
   concatenating the client session random value, the hashed value, and the username;
   computing the MAC value over the client session random value, the hashed value, and the username using one or more of the hashed password value and a displayed code value from a hardware token at the client;
   receiving a server session random value and an acknowledgment that is enciphered using a session key at the client; and
   generating, by the processing device of the client, the session key by executing an iterative second MAC function over: a concatenation of the server session random value and the client session random value, and a concatenation of the hashed password value and the displayed code value from the hardware token.

3. The method of claim 2, wherein hardware token changes the displayed code value on a regular basis.

4. The method of claim 2, wherein computing the hashed value further comprises one or more of concatenating different values or hashing a value.

5. A non-transitory computer-accessible storage medium comprising data that, when accessed by a processing device, cause the processing device to:
   receive, by the processing device of a server, a message comprising a username and a first hashed value;
   retrieve a hashed password associated with the username;
   calculate a time-dependent value associated with the username;
   calculate a second hashed value using the username, the hashed password, and the time-dependent value;
   determine whether the second hashed value matches the first hashed value from the message;
   receive a client session random value and a Message Authentication Code (MAC);
   validate the MAC value at the server;
   generate a server session random value at the server; and
   generate, by the processing device of the server, a session key by executing an iterative MAC function over: a concatenation of the server session random value and the client session random value, and a concatenation of the hashed password value and a displayed code value from a hardware token.

6. A non-transitory computer-accessible storage medium comprising data that, when accessed by a processing device, cause the processing device to:
   compute, by the processing device of a client, a hashed password value from a password, a username, and a security context identifier;
   compute a hashed value from a time-dependent value associated with the username and the hashed password value;
   transmit a message comprising the username, the hashed value, a client session random value, and a Message Authentication Code (MAC) value, the MAC value generated with a first MAC function executed by the processing device of the client;

generate the client session random value at the client;
concatenate the client session random value, the hashed value, and the username;
compute the MAC value over the client session random value, the hashed value, and the username using one or more of the hashed password value and a displayed code value from a hardware token at the client;
send the client session random value, the hashed value, the username, and the MAC value to a server;
receive a server session random value and an acknowledgment that is enciphered using a session key at the client; and
generate, by the processing device of the client, the session key by executing an iterative second MAC over: a concatenation of the server session random value and the client session random value, and a concatenation of the hashed password value and the displayed code value from the hardware token.

7. The non-transitory computer-accessible storage medium of claim 6, wherein hardware token changes the displayed code value on a regular basis.

8. The non-transitory computer-accessible storage medium of claim 6, wherein the data to compute the hashed value further comprises data to cause the processing device to compute one or more of concatenating different values or hashing a value.

9. A server comprising:
a processing device;
a hashed value computation module executable by the processing device to receive a message comprising a username and a first hashed value, and retrieve a hashed password associated with the username;
a client validation module operatively coupled to the hashed value computation module, wherein the client validation module is executable by the processing device to calculate a time-dependent value associated with the username, to calculate a second hashed value using the username, the hashed password, and the time-dependent value, and to determine whether the second hashed value matches the first hashed value from the message;
a hardware token interface coupled to the hashed value computation module, the hardware token interface to retrieve an encrypted password value associated with the username,
wherein the hashed value computation module is to receive a client session random value and a Message Authentication Code (MAC) value;
wherein the client validation module is to validate the MAC value at the server; and
a session key generator coupled to the client validation module, the session key generator to generate a session key by executing an iterative MAC function over: a concatenation of a server session random value and the client session random value, and a concatenation of the hashed password value and a displayed code value from the hardware token.

10. The server of claim 9, further comprising:
a storage device coupled to the session key generator, the storage device to store the session key.

11. A client comprising:
a processing device;
an encrypted password value generator executable by the processing device to generate a hashed password value in view of a username and a security context identifier;
a hash value generator operatively coupled to the encrypted password value generator, the hash value generator executable by the processing device to compute a hashed value from a time-dependent value associated with the username and the hashed password value, and to transmit a message comprising the username, the hashed value, and a message authentication code (MAC) value, the MAC value generated with a first MAC function executed by the processing device;
a hardware token interface coupled to the hash value generator, the hardware token interface to receive a displayed code value from a hardware token; and
a session key generator coupled to the hash value generator, the session key generator to generate a client session random value, and to compute a session key by executing an iterative second MAC function over: a concatenation of a server session random value and the client session random value, and a concatenation of the hashed password value and a displayed code value from the hardware token.

12. The client of claim 11, further comprising:
a storage device coupled to the session key generator, the storage device to store the session key,
wherein the hash value generator is to receive the client session random value and the MAC value.

13. The client of claim 12, wherein the hash value generator is to concatenate the client session random value, the hashed value, and the username; to compute the MAC value over the client session random value, the hashed value, and the username, using one or more of the hashed password value and the displayed code value from the hardware token at the client; and to send the client session random value, the hashed value, the username, and the MAC value to a server.

14. The client of claim 13, wherein the session key generator is to receive the server session random value and an acknowledgment that is enciphered using the session key, and to generate the session key in view of the server session random value, the client session random value, the hashed password value, the displayed code value from the hardware token.

15. The client of claim 13, wherein hardware token changes the displayed code value on a regular basis.

16. The client of claim 13, wherein the hash value generator is further to compute the hashed value by concatenating different values or hashing a value.

* * * * *